United States Patent
Douglas

[15] 3,643,567
[45] Feb. 22, 1972

[54] CAMERA LATCH

[72] Inventor: Lawrence M. Douglas, Easton, Mass.
[73] Assignee: Polaroid Corporation, Cambridge, Mass.
[22] Filed: Dec. 16, 1969
[21] Appl. No.: 885,420

[52] U.S. Cl. .....................................95/11 R, 95/13, 95/32, 95/39
[51] Int. Cl. .......................................G03b 17/04
[58] Field of Search.......................95/11, 13, 32, 33, 39, 40

[56] References Cited

UNITED STATES PATENTS

| | | | |
|---|---|---|---|
| 2,865,273 | 12/1958 | Meixner et al. | 95/39 |
| 3,440,939 | 4/1969 | Peterson et al. | 95/11 |
| 3,439,596 | 4/1969 | Peterson et al. | 95/11 |

Primary Examiner—Samuel S. Matthews
Assistant Examiner—Richard A. Wintercorn
Attorney—Brown and Mikulka and Alfred E. Corrigan

[57] ABSTRACT

A folding camera including a plurality of housing sections pivotally coupled for movement between a compact, folded position and an extended, operative position. A shutter-actuating member is provided for actuating the camera's shutter and a detent located adjacent the shutter actuating member is adapted for movement into locking engagement with the shutter-actuating member to prevent actuation of the camera's shutter in all positions of the camera except the fully extended, operative position. In an alternative embodiment the camera's shutter actuating member is provided with a solenoid-controlled detent. The solenoid circuit includes three switches connected in series; the first being closed by movement of the shutter-actuating member; the second being closed only when the camera is in the fully extended position; and the third being closed only when the camera's loading door is closed thereby insuring operation of the shutter only when the camera is in the fully extended position and the loading door is closed.

11 Claims, 4 Drawing Figures

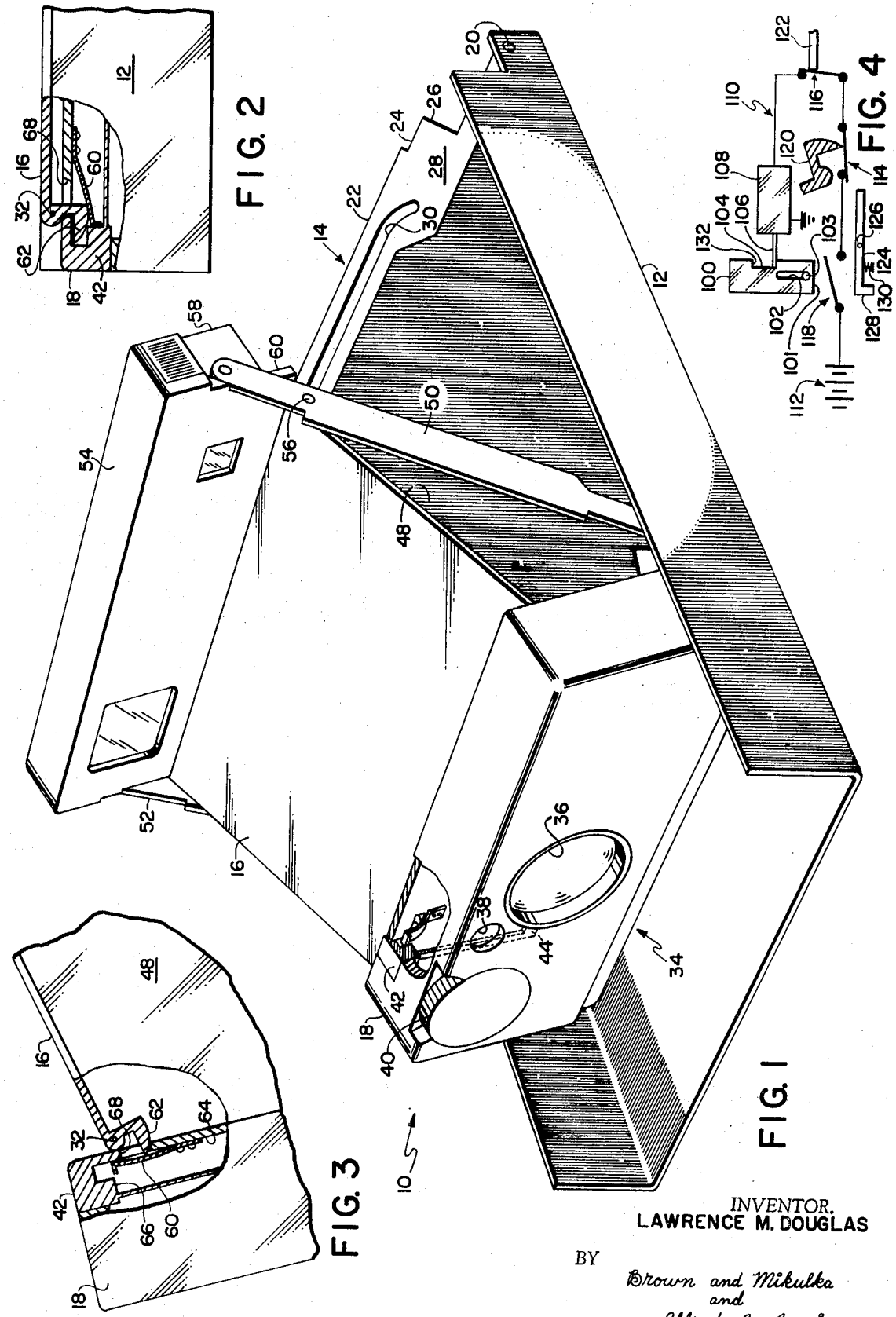

CAMERA LATCH

BACKGROUND OF THE INVENTION

1. Field of the Invention

This invention relates to cameras of the folding type and, more particularly, to such a camera which includes means for preventing actuation of the camera's shutter when the camera is not in the fully extended operative position and/or the camera's loading door is not fully closed.

Cameras of the type with which the present invention is concerned are generally comprised of a plurality of housing sections pivotally coupled to each other for movement between a folded, compact position and an operative, fully extended position. In the particular embodiment of the invention disclosed herein, one of the housing sections includes means for supporting a film unit in position for exposure when the camera is in the fully extended position and a loading door for permitting loading of a film container; a second housing section supports a reflecting surface, e.g., a mirror, for directing light toward the film unit located in position for exposure; and a third housing section includes a lens and shutter for admitting light into the interior of the camera for exposing the aforementioned film unit. When the shutter is actuated light is directed toward the reflecting surface from where it is redirected toward the film unit located in position for exposure.

One of the problems with a folding camera of the type described is to insure that the camera's shutter cannot be actuated to expose a film unit until (1) the various housing sections of the camera have assumed a predetermined spatial relationship relative to each other and/or (2) that the camera's loading door is fully closed thereby preventing light from entering the housing section by way of the loading aperture to expose the film units contained therewithin. Needless to say, the sharpness or focus of the image in the aforementioned film unit is affected not only by the adjustment of the camera's rangefinder but also by the orientation of the housing sections which carry various components of the camera's exposure system, i.e., the lens and shutter and the reflecting surface, relative to the housing section supporting the film unit in position for exposure. In other words, folding cameras of the foregoing type are constructed such that upon proper adjustment of the camera's rangefinder, the light admitted by the lens travels a predetermined distance before reaching the film unit which is positioned in or adjacent to the focal plane of the lens. If it travels more or less than this predetermined distance the focus of the image will be adversely affected. For example, unknown to the user, the erecting linkage of the camera could bind before the various housing sections reach the fully extended position, thereby changing the distance that the light travels before reaching the exposure plane. Or, the shutter-actuating member could be actuated inadvertently when the camera is in a position other than the fully extended or operative position. Accordingly, it can be seen that if the shutter-actuating member of the camera is actuated when the housing sections of the camera are not in the fully extended position, i.e., the operative position of the camera, and/or the loading door is left ajar, the exposed film unit is, for all practical purposes, of little value.

2. Description of the Prior Art

Various solutions have been proposed in the prior art for preventing accidental actuation of the camera's shutter actuating member. For example, U.S. Pat. No. 2,011,895 shows an arrangement wherein a projection overlies the shutter-actuating button to prevent operation thereof when the camera is in the folded position. However, no provision is made for preventing accidental actuation of the shutter when the camera is in a position between the fully closed and fully extended positions. U.S. Pat. No. 2,319,157 discloses a folding-type camera wherein a link arrangement connected between the camera's shutter-actuating button and the shutter trigger is disconnected as the camera sections are moved to the folded position thereby preventing accidental actuation of the shutter-actuating button when the camera is in the folded position and a position intermediate the fully extended and fully closed positions. Again, no provision is made to prevent accidental actuation of the shutter because the shutter trigger is still exposed as the various sections of the camera are moved toward the folded position; nor, to insure that the lens is located a predetermined distance from the film unit being exposed. As can readily be seen in the last-mentioned patent the shutter trigger can be actuated accidentally during folding of the camera and since the engagement between pin 23 and arm 24 in the last-mentioned patent is a sliding engagement it is apparent that the distance between the lens and film unit could be other than a predetermined fixed distance when the shutter trigger is actuated by the shutter-actuating button.

SUMMARY OF THE INVENTION

Accordingly, it is an object of the invention to provide in a folding camera of the type described including a plurality of housing sections pivotally coupled together for movement between a folded, compact position and a fully extended, operative position, means for preventing actuation of the camera's shutter when the camera is not in the fully extended position.

Another object of the present invention is to provide in a camera of the type set forth above including a loading door for allowing the loading of a film unit into position for exposure, means for preventing actuation of the camera's shutter when the camera's loading door is open.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

The foregoing objects are accomplished by enclosing the camera's shutter mechanism including its trigger or release lever in one of the camera's housing sections. A shutter-actuating means, e.g., a button, is coupled to the trigger for actuating the latter. Control means are provided for preventing operation of the shutter mechanism when the camera is not in the fully extended or operative position and/or the camera's film loading door is open. The control means may include a cam and detent arrangement positioned such that the cam controls movement of the detent into and out of locking engagement with the shutter actuating means as the sections of the camera move between the folded and extended positions. Alternatively, the shutter actuating means may be provided with a solenoid operated detent which prevents operation of the camera's shutter when either the camera is not in the fully extended position or the film-loading door is open.

BRIEF DESCRIPTION OF THE DRAWING

For a fuller understanding of the nature and objects of the invention, reference should be had to the following detailed description taken in connection with the accompanying drawing wherein:

FIG. 1 is a perspective view, partly in section, of a folding camera incorporating the instant invention;

FIG. 2 is a fragmentary view, partly in section, of one end of the camera showing the relationship between the camera's shutter actuator and a locking detent when the camera is in the folded position;

FIG. 3 is a view similar to FIG. 2 showing the camera in the extended, operative position; and FIG. 4 is a schematic view of an alternative preferred embodiment of the instant invention.

DETAILED DESCRIPTION OF THE INVENTION

Reference is now made to FIG. 1 of the drawing wherein is shown photographic apparatus in the form of a folding camera 10 of the self-developing type. Camera 10 is comprised of a plurality of housing sections 12, 14, 16 and 18 pivotally coupled to each other for movement between the fully extended, operative position shown in FIG. 1 and a compact, folded position as shown in FIG. 2. Housing section 12 includes a film-loading door and an inner frame member for supporting a film unit in position for exposure. Housing section 14 is pivotally coupled near one end to housing section 12 about hinge 20. Section 14 includes an exterior wall 22 having recesses 24 and 26 therein; sidewalls 28 (only one of which is shown) each having a groove or track 30 therein; and reflecting means, e.g., a mirror, mounted on its interior wall for directing light toward the film unit located in position for exposure within housing section 12. Housing section 14 is pivotally coupled near its opposite end to housing section 16 which in turn is pivotally coupled to housing section 18 by a hinge 32. Housing section 18 is pivotally coupled to the aforementioned inner frame member about an axis generally coincident with the axis of the topmost (as viewed in FIG. 1) roll of a pair of processing rolls or pressure applying members 34 (only the lower one of which is shown). Housing section 18 includes a lens and shutter mechanism 36, a photocell window 38, a focusing control 40 and a shutter-actuating means, e.g., a button 42. The shutter-actuating means is located substantially wholly within the confines of housing section 18 to lessen the probability of accidental actuation of the shutter mechanism 36 or damage to the button. Housing sections 12, 14, 16, and 18 cooperate with a flexible bellows 48 to define a lighttight exposure chamber.

An erecting system including a pair of links 50 and 52 and a rangefinder-viewfinder 54 is provided for guiding the various housing sections between the folded and extended positions. The lower end, as viewed in FIG. 1, of each link 50 and 52 is pivotally connected to the inner frame member (not shown), and the upper end of each link pivotally supports the rangefinder-viewfinder 54. A pin 56 (only one of which is shown) located on an intermediate portion of each link 50 and 52 extends inwardly toward each sidewall 28 of section 14 and is slidably retained in groove or track 30 for movement relative thereto. Rangefinder-viewfinder 54 includes portions 58 and 60 of different thickness which rest within recesses 26 and 24 respectively, when the camera is in the folded position.

The shutter-actuating means 42 is coupled to a shutter release means or trigger 44 for operating the shutter to expose the film unit located within housing section 12. A control means, shown in FIGS. 1-3 as a detent 60 and cam 62, is coupled with the shutter-actuating means for preventing operation of the release means 44 by the shutter actuating means 42 whenever the various sections 12, 14, 16 and 18 of the camera are not in the fully extended position shown in FIG. 1. Detent 60 is formed of any suitable resilient material and is mounted on an interior wall 64 of housing section 18 in position to be moved by cam 62 into locking engagement with a flange 66 located on button 42. Cam 62 is mounted on the interior wall of housing section 16 and is adapted to protrude through an opening 68 in wall 64 into engagement with detent 60. As can be seen in FIGS. 2 and 3, initial movement of the various housing sections from the fully extended position shown in FIG. 3 toward the folded position shown in FIG. 2 causes cam 62 to move detent 60 into locking engagement with shutter-actuating means 42 thereby precluding the possibility of the release 44 being operated by button 42 to expose a film unit when the camera is not in the fully extended position. Cam 62 is shaped such that it maintains detent 60 in locking engagement with shutter actuating means 42 in all positions of the camera except the fully extended operative position shown in FIGS. 1 and 3. For other details of the camera and the means for processing each film unit reference is made to the copending application of Irving Erlichman, Ser. No. 824,098, filed May 13, 1969 and Erlichman et al., Ser. No. 764,142, filed Oct. 1, 1968, now U.S. Pat. No. 3,545,357, and assigned to the assignee of the instant application.

In some instances it may be possible for light to enter the camera and expose the forwardmost film unit located in position for exposure if its film-loading door is not fully closed. If the camera's shutter is actuated at this time the camera's film advancing and processing apparatus will deliver to the user thereof, the aforementioned forwardmost film unit. This film unit, if previously exposed by light entering the film-loading door, will obviously be ruined due to the double exposure. Also, note that when the film units are stacked in a pile, the forwardmost film unit is the only one which has its photosensitive surface uncovered. Therefore, if the user of the camera actuates the shutter while the film-loading door is partially open, he will also prematurely expose the next succeeding film unit to light entering the film-loading door when the forwardmost film unit has been moved out of its exposure position. If the user does not identify the first double exposure with the open door further actuations of the shutter will result in premature exposure of each succeeding film unit to light entering by way of the open door. Accordingly, it would be desirable to prevent operation of the release means 44 by shutter-actuating means 42 not only when the camera is not in the fully extended position but also in the case where the film-loading door 12 is not fully closed. FIG. 4 shows a schematic representation of a preferred alternative embodiment covering this latter concept. The camera's shutter-actuating means or button is designated by reference numeral 100 and includes elongated recesses 102 and 104. Recess 102 has a pin 103 resiliently mounted therein by suitable means (not shown) for movement in a vertical direction as viewed in FIG. 4. Recess 104 is adapted to receive the core 106 of a solenoid 108 when the solenoid is not energized. Solenoid 108 is part of a control means which includes an electrical circuit, designated generally by reference numeral 110, a source of power 112 and first, second and third switch means 114, 116, and 118, respectively, for connecting the source of power 112 with the solenoid 108. First switching means 114 is adapted to be opened by a cam 120 as soon as the various housing sections of the camera start to move out of the fully extended position of the camera toward the folded position. Second switch means 116 is adapted to be closed by a member 122 coupled with the camera's film-loading door 12 when the door is closed. Switch means 116 is normally biased into an open position to prevent a flow of current therethrough when the door 12 is not closed, e.g., switch means 116 could be spring biased to the open position. Third switch means 118 is normally biased to an open position and is adapted to be closed by engagement of pin 103 therewith as the shutter-actuating means 100 is depressed downwardly as viewed in FIG. 4. A lever 124 pivoted about axis 126 and biased by spring 130 into the horizontal position shown in FIG. 4 is positioned below shutter-actuating means 100 for engagement by the lower end 101 of shutter-actuating means 100. An arm 128 connects the lever 124 with the shutter release means 44.

The operation of the embodiment shown in FIG. 4 will now be described. As represented, the camera's film-loading door is closed and the camera is in the fully extended position. Shutter-actuating means 10 is depressed until pin 103 engages and closes switch 118, further downward movement of the shutter-actuating means being prevented because of the engagement of lip 132 by core 106. When the circuit is completed through the solenoid 108 by closing switch means 118, the detent or core 106 moves from a first position shown in FIG. 4 wherein operation of release 44 by shutter-actuating means 100 is prevented due to the engagement of lip 132 by core 106 to a second position wherein actuating means 100 can be further depressed until end 101 engages and moves lever 124 to actuate the release means 44. Assuming that the door 12 is closed and the camera is in the fully extended position, initial depressing action on shutter-actuating means 100 will move pin 103 into engagement with switch means 118 to close the latter, thereby completing the circuit through the solenoid to withdraw the core 106 from recess 104. Since the detent or core 106 is now in the withdrawn position further depression of actuating means 100 will cause its lower end 101 to engage and move lever 124 counterclockwise to actuate release means 44 by the downward movement of arm 128. This further depressing of actuating means 100 while simultaneously maintaining switch means 118 in a closed or conducting condition is possible because of the movement of pin 103 to the top of recess 102. Suitable means such as a spring may be provided for urging pin 103 to the bottom of recess 102. As is readily apparent, should either or both switch means 114 and/or 116 be open due to the camera's film door 12 being open or the camera not being in the fully extended, operative position, actuation of the release means 44 by the shutter-actuating means 100 is prevented because the circuit through solenoid 108 is not complete. If the circuit is open the solenoid remains deenergized and detent 106 will assume the position shown in FIG. 4 wherein downward movement of the shutter-actuating means is limited by the coaction between the detent or core 106 and lip 132.

From the foregoing it can be seen that the objects of the invention have been achieved in a new and unobvious manner. The camera's shutter actuator or button is provided with a simple and effective control for insuring against operation of the camera's shutter by the button when the camera is either not in the fully extended position or the film-loading door is ajar.

Since certain changes may be made in the above apparatus without departing from the scope of the invention herein involved, it is intended that all matter contained in the above description or shown in the accompanying drawing shall be interpreted as illustrative and not in a limiting sense.

I claim:

1. A folding camera including a plurality of housing sections pivotally coupled to each other for movement between a fully extended, operative position, and a folded, compact position, the improvement comprising, in combination:
   shutter means including release means enclosed within one of said housing sections for controlling the admission of light into the interior of said camera to expose a film unit located in position for exposure;
   shutter-actuating means coupled to said release means for operating said shutter means; and
   control means including detent means and cam means for moving said detent means into locking engagement with said shutter-actuating means upon initial movement of at least one of said housing sections toward said folded position, said detent means preventing operation of said release means by said shutter actuating means in all positions of said camera except said fully extended position.

2. A folding camera as defined in claim 1 wherein said detent means is mounted on said one housing section and said cam means is mounted on another of said housing sections whereby movement of one of said one and said other housing sections out of said fully extended position moves said detent means into locking engagement with said shutter-actuating means.

3. A folding camera as defined in claim 2 wherein said shutter-actuating means is substantially located wholly within the confines of said one housing section to lessen the probability of accidental actuation of said shutter means.

4. A folding camera as defined in claim 3 wherein said detent means include a resilient member mounted on said one housing section and adapted for movement into locking engagement with said shutter-actuating means and said cam means controls movement of said resilient member into and out of locking engagement with said shutter-actuating means as said housing sections move between said extended and folded positions.

5. A folding camera including a plurality of housing sections pivotally coupled to each other for movement between a fully extended, operative position, and a folded, compact position, the improvement comprising, in combination:
   shutter means including release means enclosed within one of said housing sections for controlling the admission of light into the interior of said camera to expose a film unit located in position for exposure;
   shutter-actuating means coupled to said release means for operating said shutter means; and
   control means responsive to initial movement of at least one of said housing sections toward said folded position for preventing operation of said release means by said shutter-actuating means, said control means include detent means movable between a first position in which it prevents operation of said release means by said shutter-actuating means and a second position wherein said shutter-actuating means may operate said release means and an electrical circuit including a source of power and means connected to said source of power for moving said detent means from said first position to said second position.

6. A folding camera as defined in claim 5 wherein said electrical circuit includes switch means responsive to movement of said camera toward said folded position for opening said circuit thereby allowing movement of said detent means from said second position to said first position to prevent operation of said release means by said shutter actuating means.

7. A folding camera as defined in claim 6 wherein said camera includes a film-loading door, said electrical circuit further including second switch means connected in series with said first-mentioned switch means for opening said circuit when said film-loading door is open thereby preventing operation of said release means by said shutter actuating means.

8. A folding camera as defined in claim 7 wherein said electrical circuit includes third switch means connected in series with said first and second switch means, said third switch means being coupled to said shutter-actuating means whereby initial movement of said shutter-actuating means closes said third switch means to move said detent means into said second position to allow operation of said release means by further movement of said shutter actuating means.

9. A folding camera including a plurality of housing sections pivotally coupled to each other for movement between a fully extended operative position and a compact, folded position and a film-loading door providing ingress to said camera for locating a film unit in position for exposure, the improvement comprising, in combination:
   shutter means including release means for controlling the admission of light into said camera to expose a film unit located in position for exposure;
   shutter-actuating means coupled to said release means for operating said shutter means; and
   control means for preventing operation of said release means by said shutter-actuating means when said film loading door is open.

10. A folding camera as defined in claim 9 wherein said control means includes means for preventing operation of said release means by said shutter-actuating means when said camera is out of said fully extended position.

11. A folding camera as defined in claim 10 wherein said control means include a solenoid and an electrical circuit including a source of power for controlling operation of said solenoid between a first position in which said solenoid prevents operation of said release means by said shutter-actuating means and a second position wherein said shutter-actuating means may operate said release means, said solenoid assuming said first position when not energized and said second position when energized.

* * * * *